(12) United States Patent
Farrow (10) Patent No.: US 7,962,849 B2
(45) Date of Patent: Jun. 14, 2011

(54) PROCESSING OF USER CHARACTER INPUTS HAVING WHITESPACE

(75) Inventor: Glynn Farrow, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 1124 days.

(21) Appl. No.: 11/371,810

(22) Filed: Mar. 9, 2006

(65) Prior Publication Data

US 2006/0224958 A1 Oct. 5, 2006

(30) Foreign Application Priority Data

Mar. 30, 2005 (SG) .............................. 200501989-8

(51) Int. Cl.
*G06F 17/27* (2006.01)
(52) U.S. Cl. .................. 715/264; 715/256; 715/271
(58) Field of Classification Search .................. 715/264
See application file for complete search history.

(56) References Cited

U.S. PATENT DOCUMENTS

| | | | | | |
|---|---|---|---|---|---|
| 5,787,452 | A | * | 7/1998 | McKenna | 715/234 |
| 5,991,882 | A | * | 11/1999 | O'Connell | 726/18 |
| 6,035,268 | A | * | 3/2000 | Carus et al. | 704/9 |
| 6,185,683 | B1 | * | 2/2001 | Ginter et al. | 713/176 |
| 6,665,839 | B1 | | 12/2003 | Zlotnick | |
| 6,804,667 | B1 | * | 10/2004 | Martin | 707/6 |
| 6,915,279 | B2 | * | 7/2005 | Hogan et al. | 705/64 |
| 7,043,230 | B1 | * | 5/2006 | Geddes et al. | 455/410 |
| 7,725,501 | B1 | * | 5/2010 | Stillman et al. | 707/805 |
| 2003/0066058 | A1 | | 4/2003 | Van De Vanter | |
| 2003/0177364 | A1 | * | 9/2003 | Walsh et al. | 713/182 |
| 2003/0182103 | A1 | * | 9/2003 | Atkin | 704/9 |
| 2006/0148495 | A1 | * | 7/2006 | Wilson | 455/466 |

OTHER PUBLICATIONS

Frederick J. Fuglister; squeeze_sol.c; 2002; John Carroll University; p. 1.*
Elsner, et al.; Using as; The GNU Assembler; Jan. 1994; 122 pages; http://www.brightstareng.com/pub/as.pdf.

* cited by examiner

*Primary Examiner* — Laurie Ries
*Assistant Examiner* — Andrew R Dyer
(74) *Attorney, Agent, or Firm* — Schmeiser, Olsen & Watts; John Pivnichny (57) ABSTRACT

A method and system for processing a user input character string entered by a user into a computer system that comprises a browser. The user input character string is received. The user input character string conforms to a native character set and encoding of the browser for a language selected by the user. The user input character string is converted to a converted character string consisting of characters of a Universal Character Set (UCS) which are independent of platform and language. Any leading and any trailing whitespace characters in the converted character string are removed. Following the removal of any leading and any trailing whitespace characters in the converted character string, any remaining whitespace characters of the converted character string are converted to a single value, resulting in the converted character string being a resultant character string.

17 Claims, 7 Drawing Sheets

PROCESSING OF USER CHARACTER INPUTS HAVING WHITESPACE

BACKGROUND OF THE INVENTION

1. Technical Field

The present invention relates to user interface software and, more particularly, to a method, computer program product and computer system for processing whitespace in user input character strings.

2. Related Art

In today's global economy, computer software is designed, developed and marketed to meet the demands of an international customer base Software solutions (whether client-server or web-based) must be capable of providing a consistent and functional user interface across a wide range of languages.

However, the production of internationalized software is not without its challenges. For example, users, in general, enter information in different and inconsistent ways. Developing a 'write once, run everywhere' solution that processes multi-lingual information in a similar way, regardless of language or platform has certain disadvantages.

For example, in a conventional web-based environment, a web-form may be used to implement a "Security question—Security answer" scenario. The web-form is used to prompt a user to submit information at one time and to then prompt that user to re-submit the same information at a later time as a means of identification.

Figure 1:
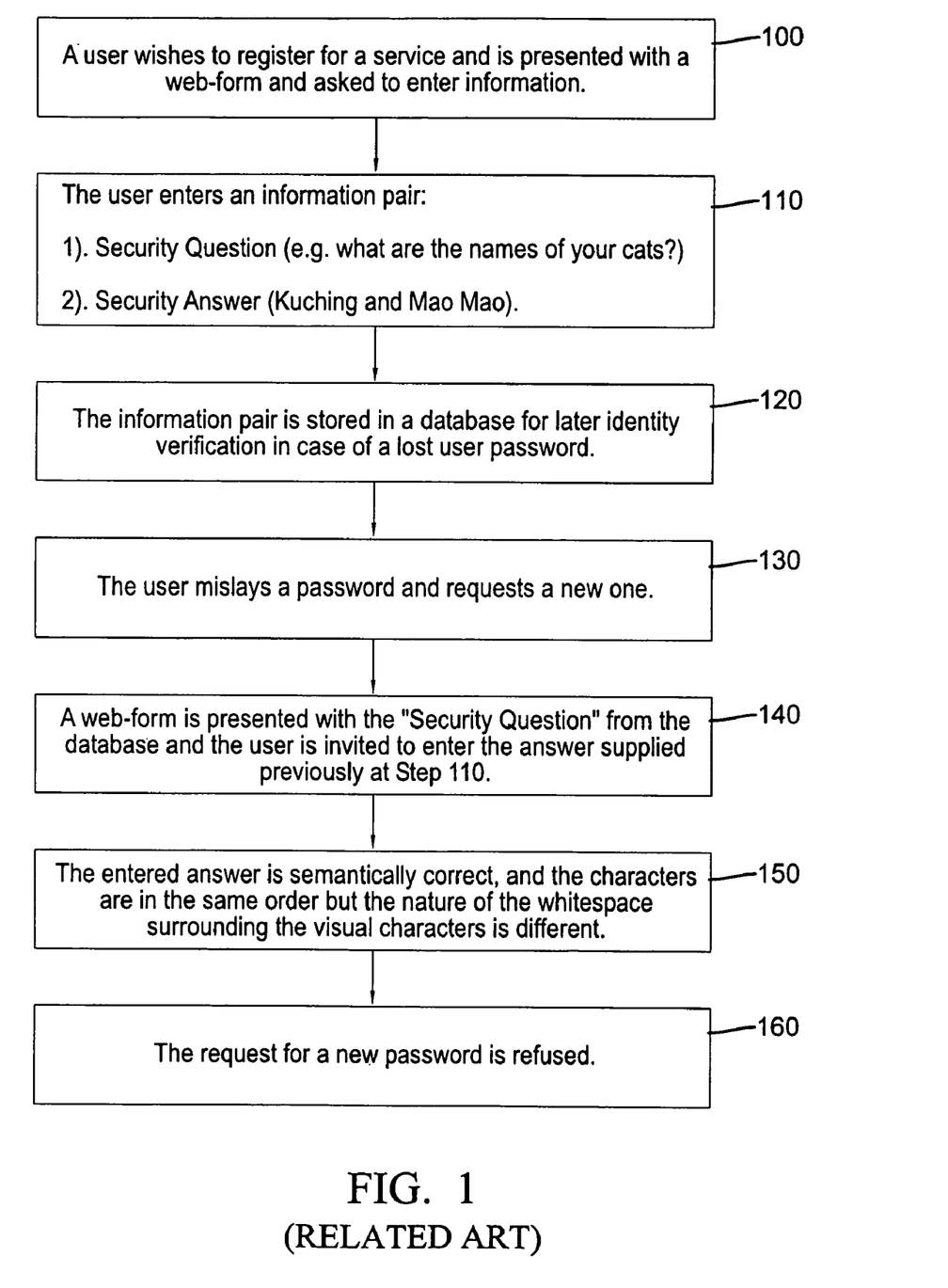
FIG. 1 is a flow chart representation of a conventional "Security question—Security answer" scenario, in accordance with the related art.

Referring to FIG. 1, at step 100, a user wishes to register for a service of an organization and is presented with a web-form and asked to enter certain information. At step 110 and as part of this registration information, the user enters an information pair known as a "Security question—Security answer" set. For example, the security question could be: "What are the names of your cats?". The security answer might be: "Kuching and Mao Mao".

At step 120, this information pair is stored in a database for later identity verification in case the user loses a password.

At step 130, and at some point in time after registration, the user may mislay a password and consequently request a new one. At step 140, a short web-form is presented with the security question from the database. The user is prompted to enter the answer supplied previously at step 110. At step 150, the software detects that the entered answer is semantically correct, and the characters are in the same order, but the nature of the whitespace surrounding the glyphs (that is, the visual characters) is different. This typically occurs because the user is careless with the character input and adds or omits whitespace characters before and/or after the glyphs. Accordingly, at step 160, the software incorrectly refuses the request for a new password. Thus the result may be an irritated user and a potential loss of business for the organization.

Therefore, a need exists to provide processing of whitespace in multi-lingual user input that overcomes or substantially ameliorates one or more disadvantages and shortcomings of existing arrangements.

SUMMARY OF THE INVENTION

The present invention provides a method for processing a user input character string entered by a user into a computer system that comprises a browser, said method comprising:

receiving the user input character string, said user input character string conforming to a native character set and encoding of the browser for a language selected by the user;

converting the user input character string to a converted character string consisting of characters of a Universal Character Set (UCS) which are independent of platform and language;

removing any leading and any trailing whitespace characters in the converted character string; and converting any remaining whitespace characters of the converted character string to a single value, resulting in the converted character string being a resultant character string.

The present invention provides a computer program product comprising a computer readable medium having a computer program recorded therein, said computer program adapted to be executed on a processor of a computer system to perform a method for processing a user input character string entered by a user into the computer system, said computer system comprising a browser, said method comprising:

receiving the user input character string, said user input character string conforming to a native character set and encoding of the browser for a language selected by the user;

converting the user input character string to a converted character string consisting of characters of a Universal Character Set (UCS) which are independent of platform and language;

removing any leading and any trailing whitespace characters in the converted character string; and converting any remaining whitespace characters of the converted character string to a single value, resulting in the converted character string being a resultant character string.

The present invention provides a computer system comprising a memory unit and a processor to the memory unit, said memory unit containing instructions that when executed by the processor implement a method for processing a user input character string entered by a user into a computer system that comprises a browser, said method comprising:

receiving the user input character string, said user input character string conforming to a native character set and encoding of the browser for a language selected by the user;

converting the user input character string to a converted character string consisting of characters of a Universal Character Set (UCS) which are independent of platform and language;

removing any leading and any trailing whitespace characters in the converted character string; and after said removing, converting any remaining whitespace characters of the converted character string to a single value, resulting in the converted character string being a resultant character string.

DETAILED DESCRIPTION OF THE INVENTION

Where reference is made in any one or more of the accompanying drawings to steps and/or features, which have the same reference numerals, those steps and/or features have for the purposes of this description the same function(s) or operation(s), unless the contrary intention appears.

Embodiments of the invention provide fault tolerance in terms of users using variable numbers of whitespace characters at different instances of time. Additionally, the use of UCS and a single value replacement of whitespace character allows multiple users using different language sets to be accommodated at the same time.

FIGS. 2 to 7 show a method, computer program product and computer system for fault-tolerant pre-processing of whitespace in multi-lingual user input, in accordance with embodiments of the present invention.

Figure 2:
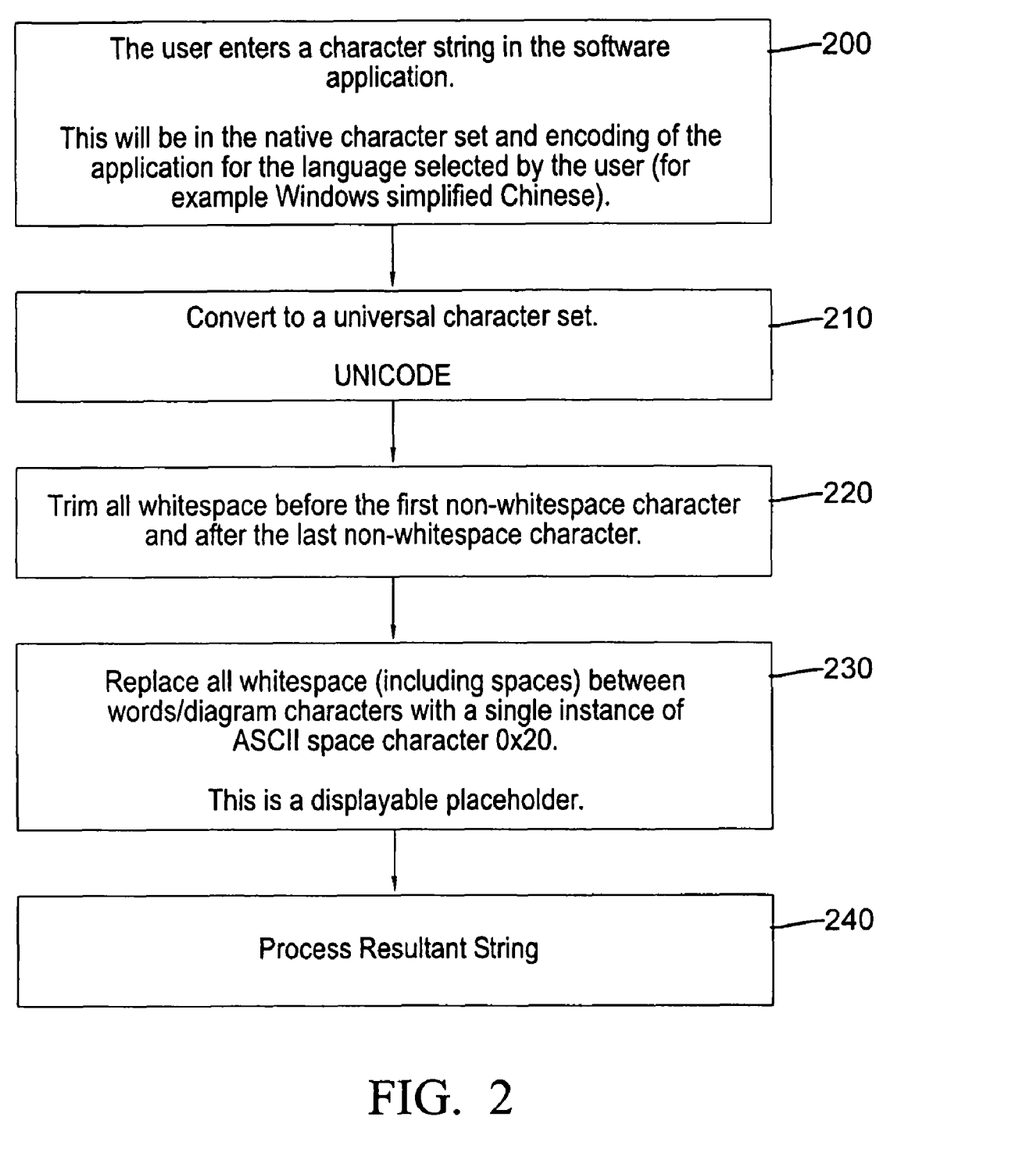
FIG. 2 is a flow chart representation of a "Security question—Security answer" scenario, in accordance with embodiments of the present invention.

FIG. 2 shows a flow chart of a "Security question—Security answer" scenario according to an aspect of the present invention. At step 200, a software application (for example a web browser) prompts the user for a "security question" and "security answer" pair. Accordingly, the user enters the information pair. The character strings as entered by the user will conform to the native character set and encoding of the browser for the language as selected by the user. For example, the encoding could be "Windows simplified Chinese".

At step 210, a character string (for example the "security answer" character string) is converted to a Universal Character Set (UCS), for example UNICODE. At step 220, all whitespace characters before the first non-whitespace character and all whitespace characters after the last non-whitespace character are trimmed from the character string. At step 230, all whitespace characters (including spaces) between words/diagram characters are replaced with a single instance of the ASCII space character 0x20 (hexadecimal 20). This space character is also known as a displayable placeholder. At step 240, the character string is stored in the database or is compared with the corresponding value previously stored in the database.

Referring again to FIG. 2, at step 210, the user input character string is converted to a converted character string, namely a UCS string such as a UNICODE character string. UNICODE (see www.unicode.org) enables a single software product to be deployed across multiple platforms, languages and countries without re-engineering. UNICODE does this by providing a unique number (called a code-point) for every character in all known character sets, regardless of platform, computer program or language.

Thus characters that could be one of many numbers in other encodings which map to one character, say a double dash with space, are entered as a single known UNICODE code-point that represents it. Accordingly, the characters are processed in a consistent manner.

Referring now to Table 1, and assuming that the byte array contains simplified Chinese GBK (Guo Biao Kuozhan)—encoded characters, a Java™ code function which performs the conversion to UNICODE is shown.

TABLE 1

Java ™ code for conversion to UNICODE

// A byte array of non-UNICODE characters
byte[] gbk_bytes = getGBKBytes( );
//convert to a String of Java 16-bit UNICODE characters
String unicodeStr = new String(gbk_bytes, "GBK");

Referring again to FIG. 2, at step 220, any leading and any trailing whitespace characters are trimmed from the character string. In the context of this specification, the term "trimming" (or removal) of any leading and any trailing whitespace is understood to include the range of possibilities for removal of whitespace characters from a character string. Accordingly, trimming is understood to include removal of any leading whitespace characters (if such characters exist); or removal of any trailing whitespace characters (if such characters exist); or removal of any leading and any trailing whitespace characters (if such characters exist in the character string). There also can be instances where no leading or trailing whitespace characters exist, and the trimming process is still performed but on a null data set.

Figure 3:
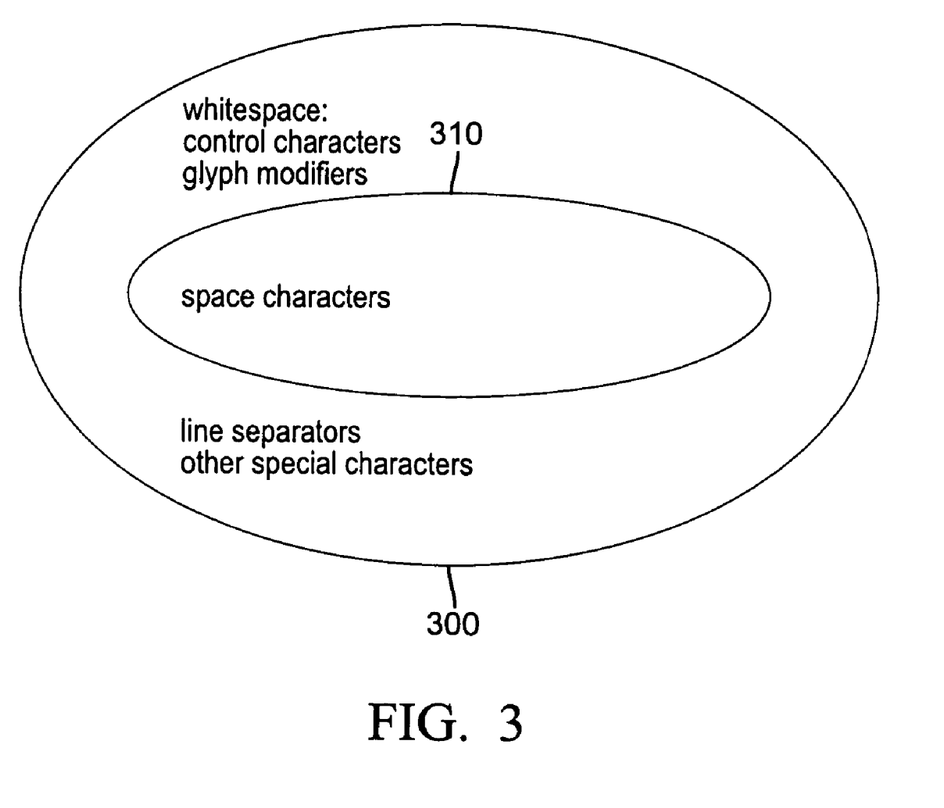
FIG. 3 is a schematic representation of UNICODE whitespace code-points showing the subset of space characters, in accordance with embodiments of the present invention.

As shown in FIG. 3, in the first 64,000 UNICODE code-points 300, there are defined 25 whitespace characters, 17 of which are space characters 310. For example, 0x0020, 0x00A0, 0x3000 are all examples of UNICODE space characters.

A Java™ code function to trim a UNICODE character string is shown in Table 2.

TABLE 2

Java ™ code to trim whitespace characters

```
public static String getTrimmedUnicodeString(String s) {
        if (s==null || "".equals(s))
            return s;
        int len = s.length( );
        int st = 0;
        char[] val = s.toCharArray( );
        while ((st<len) && Character.isWhitespace(val[st]))
        {
            st++;
        }
        while ((st<len) && Character.isWhitespace(val[len-1])) {
            len--;
        }
        return s.substring(st, len);
}
```

Figure 4:
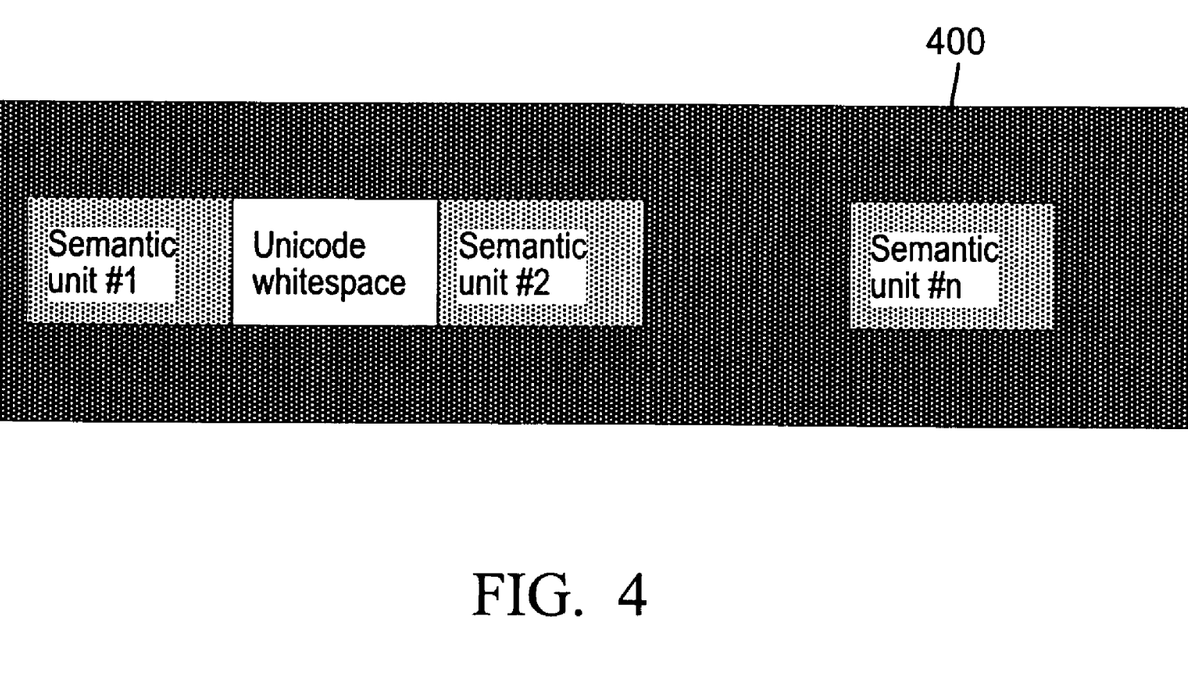
FIG. 4 is a schematic representation of a trimmed UNICODE character string, in accordance with embodiments of the present invention.

FIG. 4 shows an example of the output 400 from the Java™ function as shown in Table 2. The character string (i.e. semantic unit #1, UNICODE whitespace, semantic unit #2, . . . , semantic unit #n) has been trimmed of all whitespace at the beginning and the end of the string.

Referring again to FIG. 2, at step 230, each pure whitespace character between the words/diagram characters of the character string is now replaced with a single ASCII space (code-point 0x20), resulting in the converted character string being now a resultant character string. Table 3 shows an example Java™ function that replaces all pure whitespace character sequences with the code-point 0x20. The example Java™ function shown in Table 3 also accounts for UNICODE control characters for completeness.

TABLE 3

Java ™ function to replace whitespace with code point 0x20

```
public static String slimdown(String s) {
    if(s==null || "".equals(s))
        Return s;
    s = getTrimmedUNICODEString(s); // see above
    if("".equals(s))
        Return s;
    StringBuffer sbuff = new StringBuffer( );
    StringTokenizer st = new StringTokenizers(s,
Constants.UNICODE_WHITESPACE_CHARACTERS_LIST); // see
above
    Vector toks = new Vector( );
    while (st.hasMoreTokens( )) {
        toks.add(st.nextToken( ).trim( ));
    }
    int len = toks.size( );
    int lastIndex = len-1;
    final String SPACE_0020 = "\u0020";
    for (int n=0; n<len; n++) {
        sbuff.append((String) toks.get(n));
        if (n<lastIndex)
            sbuff.append(SPACE_0020);
    }
    return new String(sbuff);
}
```

Figure 5:
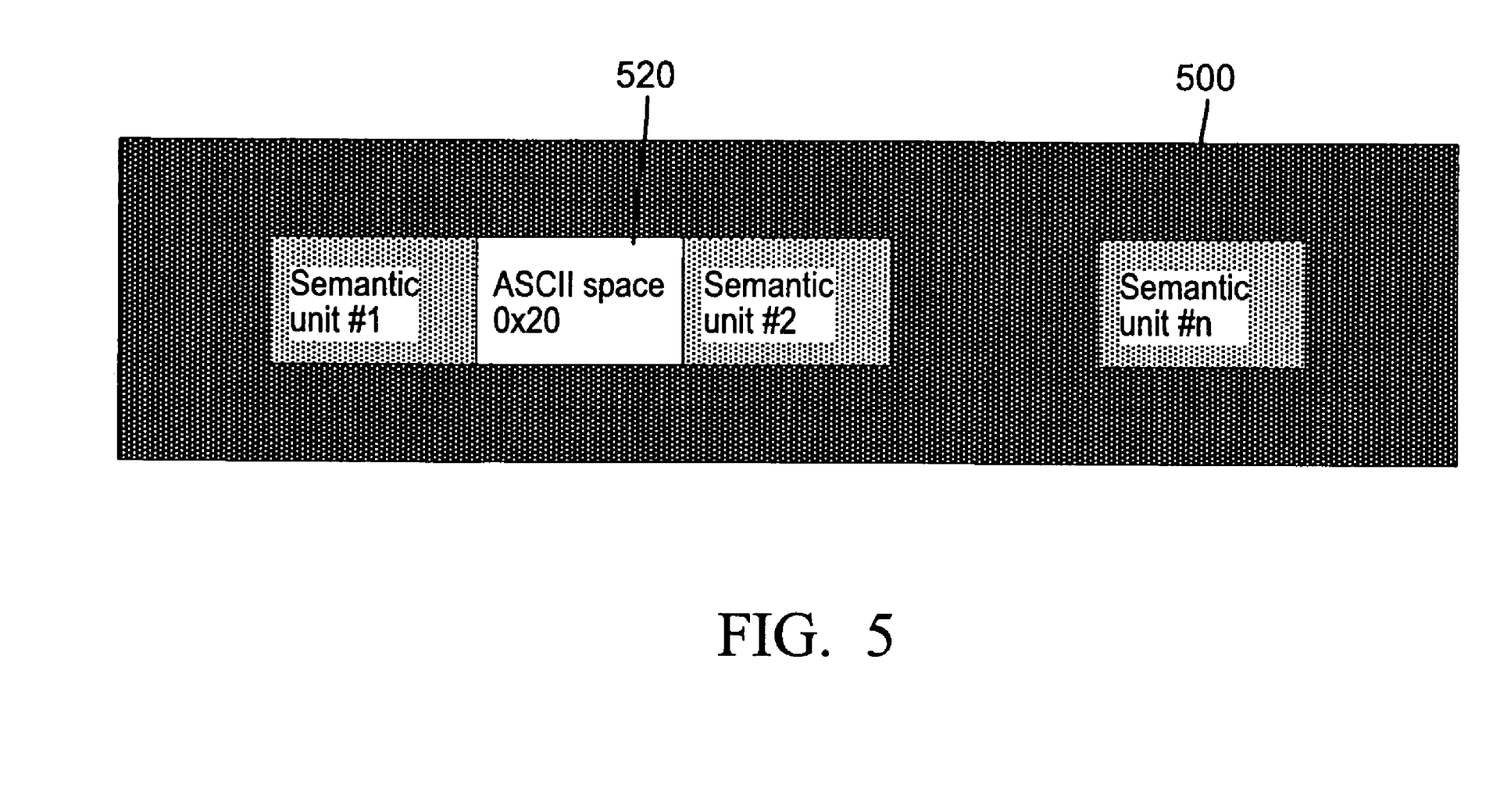
FIG. 5 is a schematic representation of a character string containing ASCII space (0x20), in accordance with embodiments of the present invention.

Referring now to FIG. 5, the output 500 from the Java™ function of Table 3 shows all UNICODE whitespace has been replaced with ASCII space "0x20" 520. ASCII space "0x20" is also mapped into most major character set encodings (such as Windows simplified Chinese). Accordingly, it is anticipated that the modified character string will display as originally intended in most situations.

Referring again to FIG. 2, step 240 processes the resultant character string resulting from step 230. The details of processing the resultant character string in step 240 of FIG. 2 are shown in steps 711-715 of FIG. 7.

Figure 7:
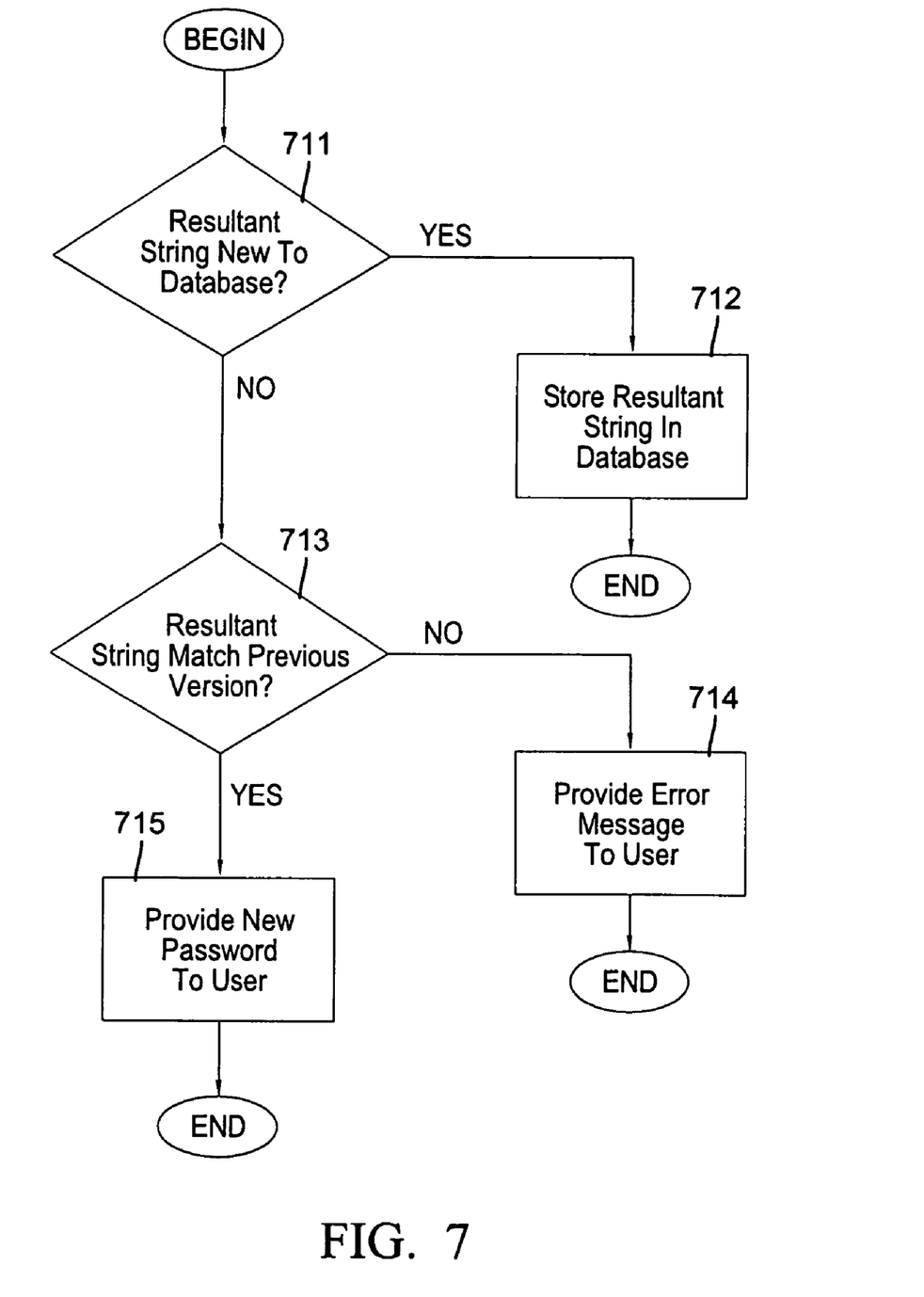
FIG. 7 is a flow chart depicting a processing of a resultant string resulting from replacing the whitespace in a converted string of FIG. 2, in accordance with embodiments of the present invention.

Step 711 determines if the resultant character string is new to the database. If step 711 determines that the resultant character string is new to the database, then step 712 stores the resultant character string in the database; otherwise step 713 is next executed.

Step 713 acertains whether the resultant character string matches a previously stored version of the resultant character string in the database. If step 713 ascertains the resultant character string does not match a previously stored version of the resultant character string in the database, then step 714 provides an error message to the user; otherwise step 715 is next executed.

Step 715 provides a new password to the user and does not provide an error message to the user.

Figure 6:
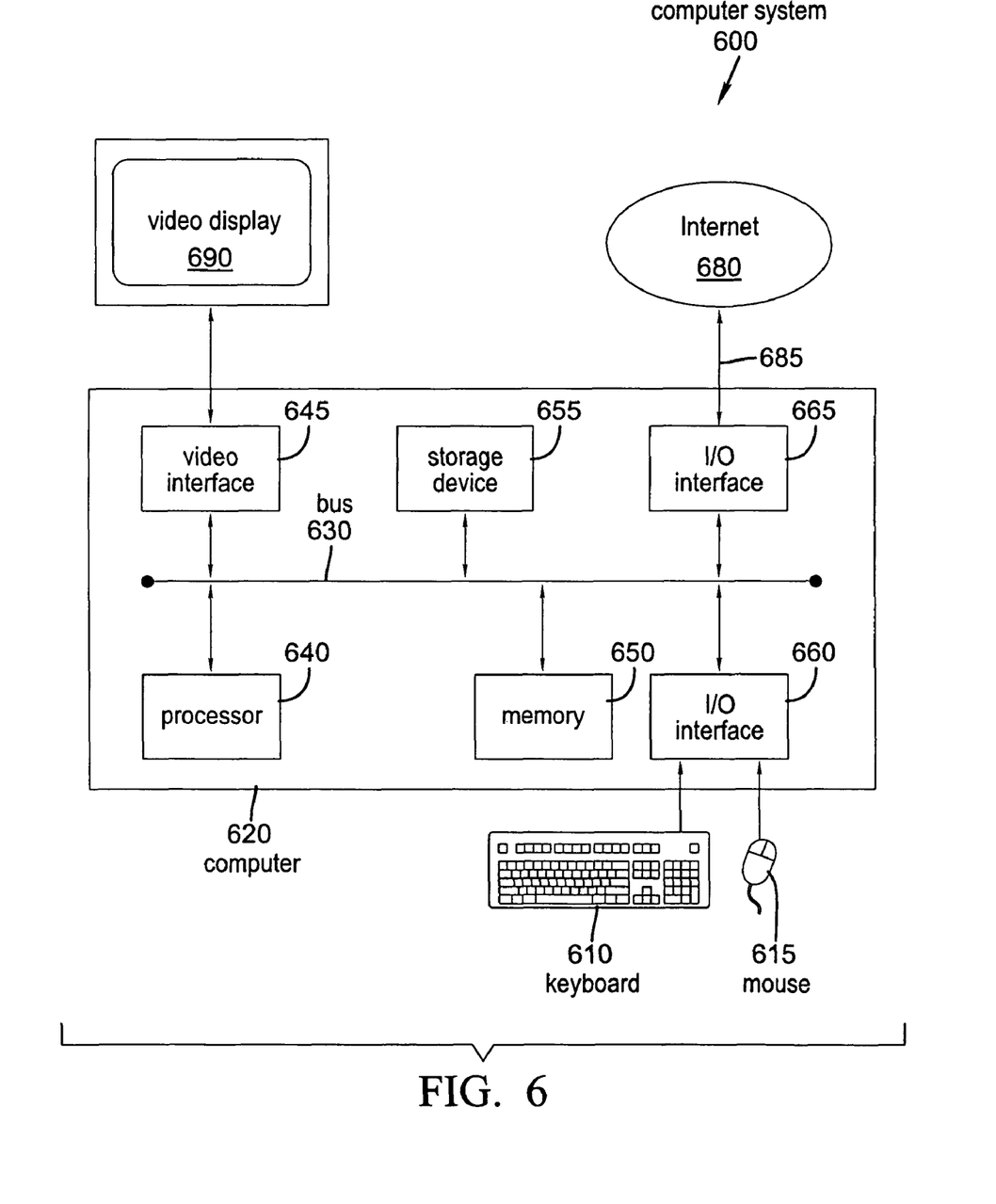
FIG. 6 is a schematic representation of a computer system on which embodiments of the invention can operate as computer software.

FIG. 6 is a schematic representation of a computer system 600 of a type that is suitable for processing whitespace in a user input. Computer software executes under a suitable operating system installed on the computer system 600, and comprises various software code means for achieving particular steps. Such software can support a client/server architecture, in the sense that computer software embodying the invention can reside on a server machine and will serve user character inputs from client machines.

The components of the computer system 600 include a computer 620, a keyboard 610 and mouse 615, and a video display 690. The computer 620 includes a processor 640, a memory 650, input/output (I/O) interfaces 660, 665, a video interface 645, and a storage device 655.

The processor 640 is a central processing unit (CPU) that executes the operating system and the computer software executing under the operating system. The memory 650 includes random access memory (RAM) and read-only memory (ROM), and is used under direction of the processor 640.

The video interface 645 is connected to video display 690 and provides video signals for display on the video display 690. User input to operate the computer 620 is provided from the keyboard 610 and mouse 615. The storage device 655 can include a disk drive or any other suitable storage medium.

Each of the components of the computer 620 is connected to an internal bus 630 that includes data, address, and control buses, to allow components of the computer 620 to communicate with each other via the bus 630.

The computer system 600 can be connected to one or more other similar computers via an input/output (I/O) interface 665 using a communication channel 685 to a network, represented in one embodiment as the Internet 680. The computer system can function as either a client or server in a networked architecture.

The computer software may be recorded on a portable storage medium, in which case, the computer software program is accessed by the computer system 600 from the storage device 655. Alternatively, the computer software can be accessed directly from the Internet 680 by the computer 620. In either case, a user can interact with the computer system 600 using the keyboard 610 and mouse 615 to operate the programmed computer software executing on the computer 620.

Other configurations or types of computer systems can be equally well used to execute computer software that assists in implementing the techniques described herein.

Although the invention has been described in what is conceived to be the most practical and preferred embodiments, it is understood that further embodiments are within the scope of the invention. For example, the invention may equally be deployed in a client/server application environment; a distributed software application environment; or in a stand-alone application environment.

Various alterations and modifications can be made to the techniques and arrangements described herein, as would be apparent to one skilled in the relevant art.

What is claimed is:

1. A method for processing a user input character string entered by a user into a computer system that comprises a browser, said method comprising:

receiving the user input character string, said user input character string conforming to a native character set and encoding of the browser for a language selected by the user;

converting the user input character string to a converted character string consisting of characters of a Universal Character Set (UCS) which are independent of platform and language, wherein the converted character string comprises a plurality of leading whitespace characters, a plurality of trailing whitespace characters, and a middle character string comprising remaining whitespace characters that include at least one grouping of at least two consecutive whitespace characters, wherein the middle character string is disposed between the leading whitespace characters and the trailing whitespace characters, and wherein the leftmost character and the rightmost character of the middle character string are not whitespace characters;

transforming the converted character string to a transformed character string by a first transformation or a second transformation, wherein said transforming the converted character string to the transformed character string by the first transformation comprises removing the leading whitespace characters and the trailing whitespace characters in the converted character string such that the transformed character string does not comprise any leading whitespace character, does not comprise any trailing whitespace character, and comprises the remaining whitespace characters; and wherein said transforming the converted character string to the transformed character string by the second transformation comprises removing the trailing whitespace characters in the converted character string such that the transformed character string does not comprise any trailing whitespace character and comprises both the leading whitespace characters and the remaining whitespace characters; and after said transforming, converting each grouping of the at least one grouping of at least two consecutive whitespace characters in the middle character string of the transformed character string to a single whitespace character, resulting in the transformed character string being converted to a resultant character string;

wherein the method comprises modifying the user input character string to generate the resultant character string;

wherein if said transforming consists of transforming the converted character string to the transformed character string by the first transformation, then said modifying consists of said converting the user input character string, said transforming the converted character string, and said converting each grouping;

wherein if said transforming consists of transforming the converted character string to the transformed character string by the second transformation, then said modifying comprises said converting the user input character string, said transforming the converted character string, and said converting each grouping.

2. The method of claim 1, wherein the method further comprises:

determining that the resultant character string is new to a database of the computer system; and responsive to and following said determining that the resultant character string is new to the database, storing the resultant character string in the database.

3. The method of claim 1, wherein the method further comprises:

determining that the resultant character string is not new to the database;

responsive to and following said determining that the resultant character string is not new to the database, then ascertaining that the resultant character string matches a previously stored version of the resultant character string in the database;

responsive to and following said ascertaining, providing the user with a new password.

4. The method of claim 1, wherein the user input character string is a null character string.

5. The method of claim 1, wherein said transforming consists of transforming the converted character string to the transformed character string by the first transformation.

6. The method of claim 1, wherein said transforming consists of transforming the converted character string to the transformed character string by the second transformation.

7. A computer program product comprising a computer readable storage device having a computer program recorded therein, said computer program adapted to be executed on a processor of a computer system to perform a method for processing a user input character string entered by a user into the computer system, said computer system comprising a browser, said method comprising:

receiving the user input character string, said user input character string conforming to a native character set and encoding of the browser for a language selected by the user;

converting the user input character string to a converted character string consisting of characters of a Universal Character Set (UCS) which are independent of platform and language, wherein the converted character string comprises a plurality of leading whitespace characters, a plurality of trailing whitespace characters, and a middle character string comprising remaining whitespace characters that include at least one grouping of at least two consecutive whitespace characters, wherein the middle character string is disposed between the leading whitespace characters and the trailing whitespace characters, and wherein the leftmost character and the rightmost character of the middle character string are not whitespace characters;

transforming the converted character string to a transformed character string by a first transformation or a second transformation, wherein said transforming the converted character string to the transformed character string by the first transformation comprises removing the leading whitespace characters and the trailing whitespace characters in the converted character string such that the transformed character string does not comprise any leading whitespace character, does not comprise any trailing whitespace character, and comprises the remaining whitespace characters; and wherein said transforming the converted character string to the transformed character string by the second transformation comprises removing the trailing whitespace characters in the converted character string such that the transformed character string does not comprise any trailing whitespace character and comprises both the leading whitespace characters and the remaining whitespace characters; and after said transforming, converting each grouping of the at least one grouping of at least two consecutive whitespace characters in the middle character string of the transformed character string to a single whitespace character, resulting in the transformed character string being converted to a resultant character string;

wherein the method comprises modifying the user input character string to generate the resultant character string;

wherein if said transforming consists of transforming the converted character string to the transformed character string by the first transformation, then said modifying consists of said converting the user input character string, said transforming the converted character string, and said converting each grouping;

wherein if said transforming consists of transforming the converted character string to the transformed character string by the second transformation, then said modifying comprises said converting the user input character string, said transforming the converted character string, and said converting each grouping.

8. The computer program product of claim 7, wherein the method further comprises:

determining that the resultant character string is new to a database of the computer system; and responsive to and following said determining that the resultant character string is new to the database, storing the resultant character string in the database.

9. The computer program product of claim 7, wherein the method further comprises:
   determining that the resultant character string is not new to the database;
   responsive to and following said determining that the resultant character string is not new to the database, then ascertaining that the resultant character string matches a previously stored version of the resultant character string in the database;
   responsive to and following said ascertaining, providing the user with a new password.

10. The computer program product of claim 7, wherein the user input character string is a null character string.

11. The computer program product of claim 7, wherein said transforming consists of transforming the converted character string to the transformed character string by the first transformation.

12. The computer program product of claim 7, wherein said transforming consists of transforming the converted character string to the transformed character string by the second transformation.

13. A computer system comprising a memory unit and a processor to the memory unit, said memory unit containing instructions that when executed by the processor implement a method for processing a user input character string entered by a user into a computer system that comprises a browser, said method comprising:
   receiving the user input character string, said user input character string conforming to a native character set and encoding of the browser for a language selected by the user;
   converting the user input character string to a converted character string consisting of characters of a Universal Character Set (UCS) which are independent of platform and language, wherein the converted character string comprises a plurality of leading whitespace characters, a plurality of trailing whitespace characters, and a middle character string comprising remaining whitespace characters that include at least one grouping of at least two consecutive whitespace characters, wherein the middle character string is disposed between the leading whitespace characters and the trailing whitespace characters, and wherein the leftmost character and the rightmost character of the middle character string are not whitespace characters;
   transforming the converted character string to a transformed character string by a first transformation or a second transformation, wherein said transforming the converted character string to the transformed character string by the first transformation comprises removing the leading whitespace characters and the trailing whitespace characters in the converted character string such that the transformed character string does not comprise any leading whitespace character, does not comprise any trailing whitespace character, and comprises the remaining whitespace characters; and wherein said transforming the converted character string to the transformed character string by the second transformation comprises removing the trailing whitespace characters in the converted character string such that the transformed character string does not comprise any trailing whitespace character and comprises both the leading whitespace characters and the remaining whitespace characters; and
   after said transforming, converting each grouping of the at least one grouping of at least two consecutive whitespace characters in the middle character string of the transformed character string to a single whitespace character, resulting in the transformed character string being converted to a resultant character string;
   wherein the method comprises modifying the user input character string to generate the resultant character string;
   wherein if said transforming consists of transforming the converted character string to the transformed character string by the first transformation, then said modifying consists of said converting the user input character string, said transforming the converted character string, and said converting each grouping;
   wherein if said transforming consists of transforming the converted character string to the transformed character string by the second transformation, then said modifying comprises said converting the user input character string, said transforming the converted character string, and said converting each grouping.

14. The computer system of claim 13, wherein the method further comprises:
   determining that the resultant character string is new to a database of the computer system; and
   responsive to and following said determining that the resultant character string is new to the database, storing the resultant character string in the database.

15. The computer system of claim 13, wherein the method further comprises:
   determining that the resultant character string is not new to the database;
   responsive to and following said determining that the resultant character string is not new to the database, then ascertaining that the resultant character string matches a previously stored version of the resultant character string in the database;
   responsive to and following said ascertaining, providing the user with a new password.

16. The computer system of claim 13, wherein said transforming consists of transforming the converted character string to the transformed character string by the first transformation.

17. The computer system of claim 13, wherein said transforming consists of transforming the converted character string to the transformed character string by the second transformation.

* * * * *